US006993757B2

(12) United States Patent
Rajagopalan (10) Patent No.: US 6,993,757 B2
(45) Date of Patent: Jan. 31, 2006

(54) METHOD AND APPARATUS FOR MULTI-VERSIONING LOOPS TO FACILITATE MODULO SCHEDULING

(75) Inventor: Mahadevan Rajagopalan, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 641 days.

(21) Appl. No.: 10/140,590

(22) Filed: May 6, 2002

(65) Prior Publication Data

US 2003/0208749 A1    Nov. 6, 2003

(51) Int. Cl.
 *G06F 9/45* (2006.01)

(52) U.S. Cl. ............... 717/160; 717/159; 717/161
(58) Field of Classification Search ............ 717/150, 717/160, 161, 154, 116, 159

See application file for complete search history.

(56) References Cited

U.S. PATENT DOCUMENTS 6,059,841 A * 5/2000 Caracuzzo ............ 717/154
6,615,403 B1 * 9/2003 Muthukumar et al. ...... 717/160

* cited by examiner

*Primary Examiner*—Tuan Dam
*Assistant Examiner*—Chih-Ching Chow
(74) *Attorney, Agent, or Firm*—Park, Vaughan & Fleming, LLP (57) ABSTRACT

One embodiment of the present invention provides a system that facilitates multi-versioning loops to facilitate modulo scheduling. Upon receiving a computer program, the system analyzes the code to locate loops within the program. When a loop is located, the system examines the loop termination condition to determine if it is based on a "not-equal-to" condition that makes it hard to determine beforehand whether the loop will terminate. If the loop termination condition is based on a "not-equal-to" condition, the system creates multiple versions of the loop, at least one of which will terminate and can be modulo scheduled, and at least one of which might be an infinite loop and consequently cannot be modulo scheduled.

19 Claims, 5 Drawing Sheets

METHOD AND APPARATUS FOR MULTI-VERSIONING LOOPS TO FACILITATE MODULO SCHEDULING

BACKGROUND

1. Field of the Invention

The present invention relates to compilers for computer systems. More specifically, the present invention relates to a method and an apparatus for creating multiple versions of loops to facilitate modulo scheduling.

2. Related Art

The latest generation of processors are able to execute multiple instructions simultaneously. However, compilers need to arrange executable code to take advantage of this parallel processing capability. Modulo scheduling is one such way in which compilers can arrange code to perform as many instructions as possible in each clock cycle.

Many computationally intensive applications spend the bulk of their time executing loops. Modulo scheduling extracts instruction-level parallelism in loops, and can thereby significantly increase the execution speed of a program. Hence, in order to maximize system performance, it is important that a compiler be able to modulo schedule as many loops as possible.

There are many different types of loops, and it may not be possible to modulo schedule all of them. In order to modulo schedule a loop, it is important that the loop be in a form such that the number of iterations of the loop be determined before the loop is executed. If the loop has a termination condition that is based on a "not-equal-to" test, then it may not be possible to determine the trip count of the loop because the loop might be an infinite loop.

In order to modulo schedule the loop, the loop has to be transformed into a form which allows the trip count of the loop to be determined before the loop is executed. Note that if the loop counter gets incremented or decremented by one, then the loop can be trivially transformed into a loop with a less than or greater than test.

What is needed is a method and apparatus for transforming loops that cannot be modulo scheduled, such as loops with a "not-equal-to" test, into a form that allows them to be modulo scheduled.

SUMMARY

One embodiment of the present invention provides a system that facilitates multi-versioning loops to facilitate modulo scheduling. Upon receiving a computer program, the system analyzes the code to locate loops within the program. When a loop is located, the system examines the loop termination condition to determine if it is based on a "not-equal-to" condition that makes it hard to determine beforehand whether the loop will terminate. If the loop termination condition is based on a "not-equal-to" condition, the system creates multiple versions of the loop, at least one of which will terminate and can be modulo scheduled, and at least one of which might be an infinite loop and consequently cannot be modulo scheduled.

In a variation on this embodiment, the system creates multiple versions of the loop by modifying the loop termination condition to be a "greater-than" condition, whereby the resulting loop can be modulo scheduled.

In a variation on this embodiment, the system creates multiple versions of the loop by modifying the loop termination condition to be a "less-than" condition, whereby the resulting loop can be modulo scheduled.

In a variation on this embodiment, the system generates code that causes a selected version of the loop to execute at run time based on the loop parameters, wherein the loop parameters include at least one of, the initial value, the final value, and the increment value.

In a variation on this embodiment, if the initial value, final value, and increment value are known, the system generates a single version of the loop which can be modulo scheduled.

In a variation on this embodiment, the system creates the multiple versions of the loop in the front end of a compiler.

In a variation on this embodiment, the system creates the multiple versions of the loop within an intermediate language optimizer within a compiler.

In a variation on this embodiment, the system creates the multiple versions of the loop in a code generator within a compiler.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
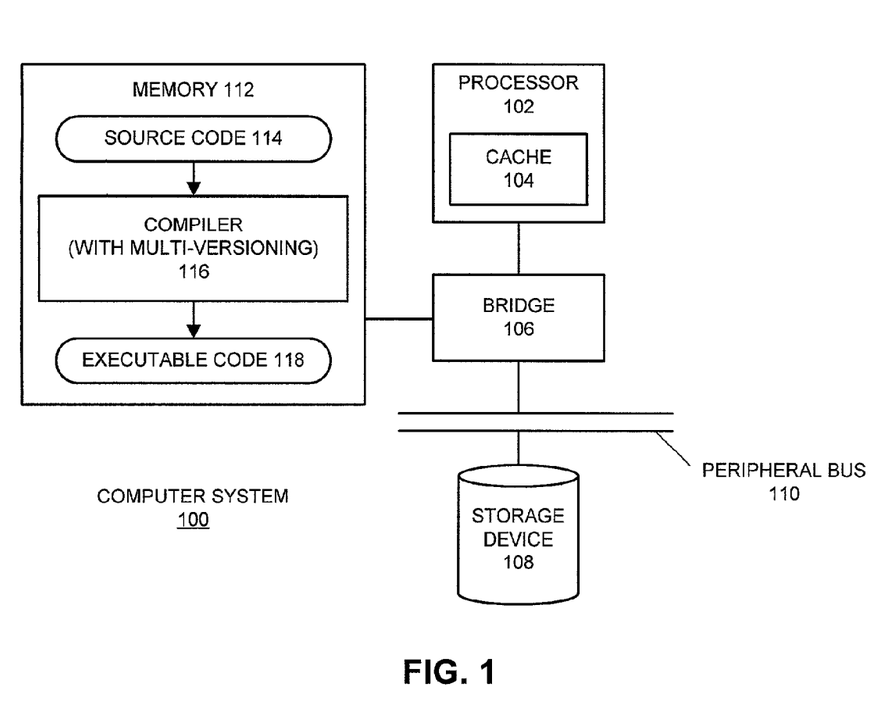
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 creates multiple versions of loops with a "not-equal-to" termination conditions to facilitate modulo scheduling, and inserts the multiple versions into executable code 118 as is described in more detail below with reference to FIGS. 2–5.

Note that although the present invention is described in the context of computer system 100 illustrated in FIG. 1, the present invention can generally operate on any type of computing device. Hence, the present invention is not limited to the specific computer system 100 illustrated in FIG. 1.

Compiler

Figure 2:
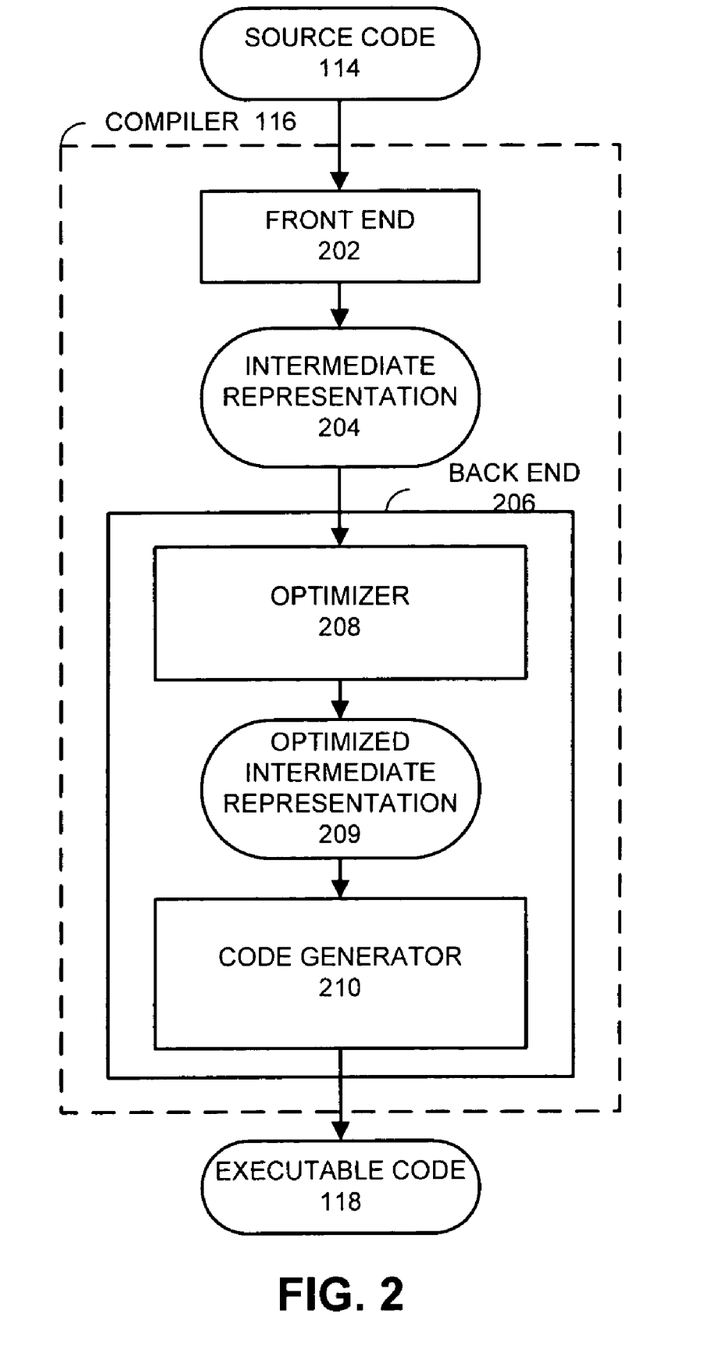
FIG. 2 illustrates the structure of a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the JAVA™ programming language. Executable code 118 includes executable instructions for a specific virtual machine or a specific processor architecture.

Compiler 116 includes a number of components, including as front end 202 and back end 206. Front end 202 takes in source code 114 and parses source code 114 to produce intermediate representation 204.

Intermediate representation 204 feeds into back end 206, which operates on intermediate representation 204 to produce executable code 118. During this process, intermediate representation 204 feeds through optimizer 208, and the resulting optimized intermediate representation 209 is passed to code generator 210.

The process of creating multiple versions of the loop to facilitate modulo scheduling can occur at a number of different places within the system. For example, the system can create multiple versions of the loop in front end 202, optimizer 208, or code generator 210.

Process of Loop Optimization

Figure 3:
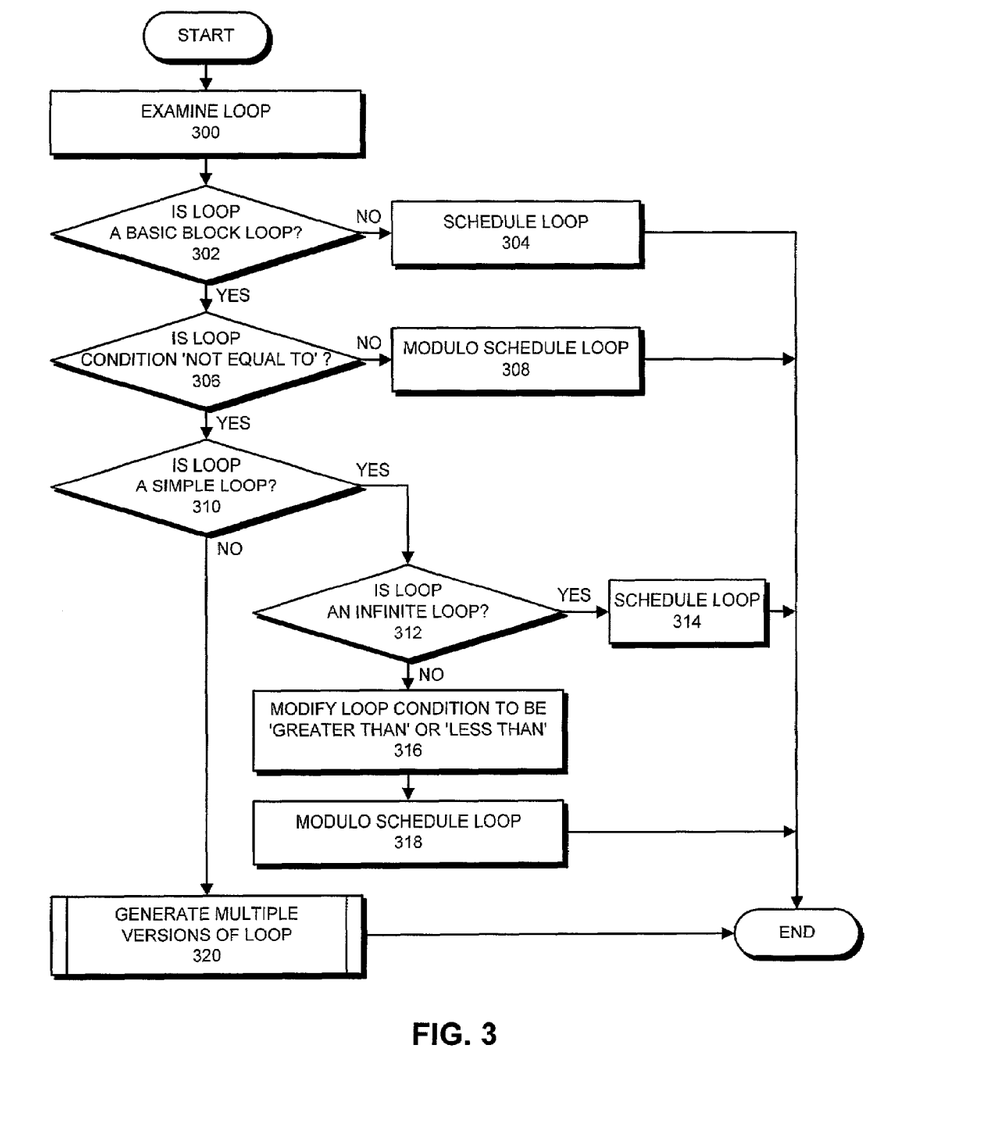
FIG. 3 illustrates the process of loop optimization in accordance with an embodiment of the present invention.

FIG. 3 illustrates the process of loop optimization in accordance with an embodiment of the present invention. The system starts by examining the loop (step 300) and determining whether the loop contains a single basic block (step 302). If the loop contains more than a single basic block, the system schedules the loop to execute without modulo scheduling (step 304) because modulo scheduling is only practical for loops containing a single basic block.

If the loop contains a single basic block, the system determines if the loop termination condition is a "not-equal-to" condition (step 306). If the loop termination condition is not a "not-equal-to" condition, then the system modulo schedules the loop (step 308). However, if the loop termination condition is a "not-equal-to" condition, then the system checks if the loop is a simple loop (step 310).

Note that a simple loop is a loop where the initial value, the final value, and the increment value are known. If all three of these values are known, it can be determined if the loop will terminate, or if the loop is an infinite loop. If one or more of these values is not known, it is impossible to determine if the loop will terminate, or if the loop is an infinite loop. If the loop is a simple loop, then the system checks if the loop is an infinite loop (step 312). If so, the system schedules the loop to execute without modulo scheduling (step 314) since infinite loops cannot be modulo scheduled. If the loop is not an infinite loop, and hence can be modulo scheduled, then the system modifies the loop termination condition to be a "greater-than" or "less-than" condition (step 316) and modulo schedules the loop (step 318).

In the situation where the loop is not a simple loop, meaning that one or more of the initial value, the final value, and the increment value is not known, the system generates multiple versions of the loop (step 320) as illustrated below in FIG. 4.

Process of Generating Multiple Versions of a Loop

Figure 4:
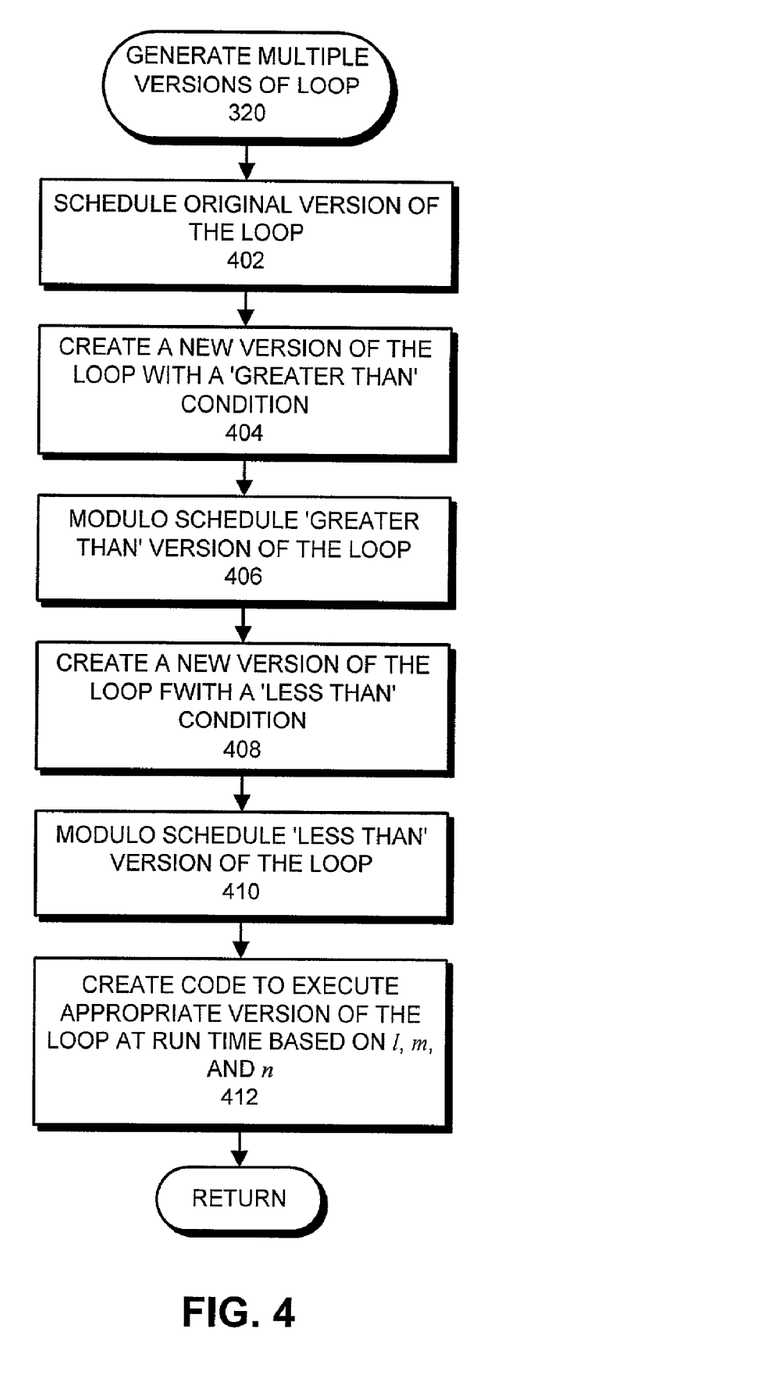
FIG. 4 illustrates the process of generating multiple versions of a loop in accordance with an embodiment of the present invention.

FIG. 4 illustrates the process of generating multiple versions of a loop in accordance with an embodiment of the present invention. If one or more of the initial value, the final value, and the increment value is not known, the loop can be optimized by creating multiple versions of the loop, at least one of which can be modulo scheduled, and at least one of which cannot be modulo scheduled.

First, the system schedules the original version of the loop without modulo scheduling (step 402). This first version of the loop is created for the case where the loop might be infinite, so that the loop cannot be modulo scheduled. Next, the system creates a second version of the loop where the loop termination condition is changed to a "greater-than" condition (step 404) and modulo schedules the "greater-than" version of the loop to execute (step 406). The system also creates a third version of the loop where the loop termination condition is changed to a "less-than" condition (step 408) and modulo schedules the "less-than" version of the loop to execute (step 410).

After the multiple versions of the loop have been created, the system generates the code to execute a selected version of the loop at runtime based on l, m, and n, or the initial value, the final value, and the increment value respectively (step 412).

Note that in some situations where some, but not all, of the values of l, m, and n are known, the system might generate only two versions of the loop where one is the original loop. For instance, if the initial value l and the final value m are known, but the increment value n is unknown, and l is less than m, then the system can produce two versions of the loop. For the case where n is negative, the loop will not terminate. Hence, the system schedules the original version of the loop without modulo scheduling. For the case where n is positive, the system creates a second version of the loop where the loop termination condition is a "less-than" condition, and modulo schedules the loop. Note that at runtime, if the value of n is found to be positive, the original version of the loop, which is an infinite loop, might still be executed if $((m-l) \bmod n) \neq 0$ since the termination condition would never be met.

Process of Executing the Appropriate Version of the Loop

Figure 5:
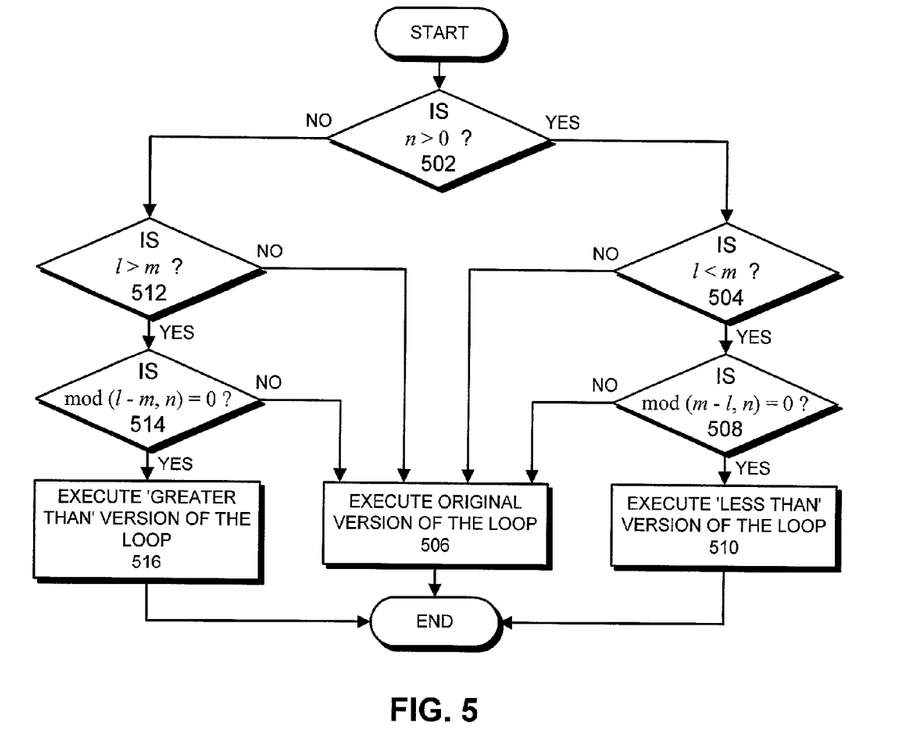
FIG. 5 illustrates the process of executing the appropriate version of the loop in accordance with an embodiment of the present invention.

FIG. 5 illustrates the process of executing the selected version of the loop in accordance with an embodiment of the present invention. At runtime, the initial value l, the final value m, and the increment value n of the loop are known, and the system determines which version of the loop to execute.

The system determines if n is greater than zero (step 502), and if so, checks if l is less than m (step 504). If l is not less than m, the loop will not terminate, so the system executes the original version of the loop, which is an infinite loop (step 506). If l is less than m, the system checks if (m−l mod n)=0 (step 508). If so, the system executes the "less-than" version of the loop (step 510). However, if the modulus is not equal to zero, then the system executes the original version of the loop which is an infinite loop (step 506).

If n is not greater than zero (step 502), the system checks if l is greater than m (step 512). If l is not greater than m, the loop will not terminate, so the system executes the original version of the loop which is an infinite loop (step 506). If l is greater than m, the system checks if (l−m mod n)=0 (step 514) and if so, executes the "greater-than" version of the loop (step 516). However, if the modulus is not equal to zero, then the system executes the original version of the loop which is an infinite loop (step 506).

Note that the increment value n is assumed not to be zero. If n is zero, then the loop is an infinite loop and would be executed as such.

For example, where the original loop is:

```
for(i=l; i!=m; i+=n {
    A [i]=0;
}
``` the loop counter is i; the loop counter initial value is l; the loop counter final value is m; the loop test is "not-equal-to"; the loop counter increment is n, and i, l, m, and n are of the integer type. The transformed code with multiple versions might look like:

```
if ((n>0 && l<m) && (mod(m−l, n)= =0)) {
    for (i=l; i<m; i+=n) {
        A[i]=0;
    }
} else if ((n<0 && l>m) && (mod(l−m, n)= =0)) {
    for (i=l; i>m; i+=n) {
        A[i]=0;
    }
} else {
    for(i=l; i!=m; i+=n {
        A[i]=0;
    }
}
```

In the transformed code, the first two loops, which are the likely case, can potentially be modulo scheduled. The third loop is the original loop itself and is an infinite loop in this instance. In most cases, the value of n is known at compile time and the transformed code would incur the penalty of only one modulus computation. Hence, with only a small overhead, the system is able to optimize loops containing a "not-equal-to" test efficiently.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for multi-versioning loops in a computer program to facilitate modulo scheduling, comprising:
    receiving the computer program;
    locating a loop within the computer program;
    examining a termination condition for the loop;
    if the loop termination condition is based on a "not-equal-to" condition that makes it hard to determine beforehand whether the loop will terminate and consequently makes it hard to modulo schedule the loop, creating multiple versions of the loop, one of which might be an infinite loop and consequently cannot be modulo scheduled, and at least one of which is a non-infinite loop which can be modulo scheduled;
    wherein creating multiple versions of the loop involves creating a version of the loop by modifying the loop termination condition to be a "greater-than" condition or to be a "less-than" condition, whereby the resulting loop can be modulo scheduled; and
    executing the computer program on a computer.

2. The method of claim 1, wherein creating multiple versions of the loop involves creating code that Causes the appropriate version of the loop to execute at run time based on loop parameters, including at least one of the initial value, the final value, and the increment value.

3. The method of claim 1, wherein if the initial value, the final value, and the increment value of the loop are known, and if they indicate the loop will terminate, generating a single version of the loop which can be modulo scheduled.

4. The method of claim 1, wherein the process of creating multiple versions of the loop takes place in the front end of a compiler.

5. The method of claim 1, wherein the process of creating multiple versions of the loop takes place within an intermediate language optimizer within a compiler.

6. The method of claim 1, wherein the process of creating multiple versions of the loop takes place in a code generator within a compiler.

7. A computer-readable storage device storing instructions that when executed by a computer cause the computer to perform a method for multi-versioning loops in a computer program to facilitate modulo scheduling, comprising:
    receiving the computer program;
    locating a loop within the computer program;
    examining a termination condition for the loop; and
    if the loop termination condition is based on a "not-equal-to" condition that makes it hard to determine beforehand whether the loop will terminate and consequently makes it hard to modulo schedule the loop, creating multiple versions of the loop, one of which might be an infinite loop that cannot be modulo scheduled, and at least one of which is a non-infinite loop which can be modulo scheduled;
    wherein creating multiple versions of the loop involves creating a version of the loop by modifying the loop termination condition to be a "greater-than" condition or to be a "less-than" condition, whereby the resulting loop can be modulo scheduled.

8. The computer-readable storage device of claim 7, wherein creating multiple versions of the loop involves creating code that causes the appropriate version of the loop to execute at run dine based on mop parameters, including at least one of the initial value, the final value, and the increment value.

9. The computer-readable storage device of claim 7, wherein if the initial value, the final value, and the increment value of the loop are known, and if they indicate the loop will terminate, generating a single version of the loop which can be modulo scheduled.

10. The computer-readable storage device of claim 7, wherein the process of creating multiple versions of the loop takes place in the front end of a compiler.

11. The computer-readable storage device of claim 7, wherein the process of creating multiple versions of the loop takes place within an intermediate language optimizer within a compiler.

12. The computer-readable storage device of claim 7, wherein the process of creating multiple versions of the loop takes place in a code generator within a compiler.

13. An apparatus for multi-versioning loops in a computer program to facilitate modulo scheduling, comprising:
- a receiving mechanism configured to receive the computer program;
- a loop examination mechanism configured to examine a termination condition for each loop in the computer program;
- a multi-versioning mechanism, wherein if the loop termination condition is based on a "not-equal-to" condition tat makes it bard to determine beforehand whether the loop will terminate and consequently makes it hard to modulo schedule the loop, the multi-versioning mechanism is configured to create multiple versions of the loop, one of which might be an infinite loop that cannot be modulo scheduled, and at least one of which is a non-infinite loop which can be modulo scheduled;
- wherein the multi-versioning mechanism is further configured to create a version of the loop by modifying the loop termination condition to be a "greater-than" condition or to be a "less-than" condition, whereby the resulting loop can be modulo scheduled; and
- a computer that is configured to execute the program.

14. The apparatus of claim 13, wherein the multi-versioning mechanism is further configured to create code that causes the appropriate version of the loop to execute at run time based on loop parameters, including at least one of the initial value, the final value, and the increment value.

15. The apparatus of claim 13, wherein the multi-versioning mechanism is further configured to create a single version of the loop which can be modulo scheduled if the initial value, the final value, and the increment value of the loop are known.

16. The apparatus of claim 13, wherein the multi-versioning mechanism exists in the front end of a compiler.

17. The method of claim 13, wherein the multi-versioning mechanism exists within an intermediate language optimizer within a compiler.

18. The apparatus of claim 13, wherein the multi-versioning mechanism exists in a code generator within a compiler.

19. A computer-readable storage medium containing executable code for a program;
- wherein the executable code includes multiple versions of a loop, one of which might be an infinite loop, and one of which is a non-infinite loop which can be modulo scheduled;
- wherein the executable code further includes code that determines which version of the given loop to execute based on loop parameters including at least one of the initial value, the final value, and the increment value;
- wherein the infinite loop has a termination condition based on a "not-equal-to" condition; and
- wherein the non-infinite loop has a termination condition based on a "greater-than" condition or on a "less-than" condition.

* * * * *

UNITED STATES PATENT AND TRADEMARK OFFICE
CERTIFICATE OF CORRECTION

PATENT NO. : 6,993,757 B2
DATED : January 31, 2006
INVENTOR(S) : Mahadevan Rajagopalan It is certified that error appears in the above-identified patent and that said Letters Patent is hereby corrected as shown below:

<u>Column 6,</u>
Line 29, delete "Causes" and replace with -- causes --.

<u>Column 7,</u>
Line 2, delete "dine" and replace with -- time --.
Line 2, delete "mop" and replace with -- loop --.
Line 29, delete "bard" and replace with -- hard --.

Signed and Sealed this

Eighteenth Day of April, 2006

JON W. DUDAS
*Director of the United States Patent and Trademark Office*